United States Patent
Elrich

(10) Patent No.: US 8,958,290 B2
(45) Date of Patent: Feb. 17, 2015

(54) MULTI-LEVEL MULTI-PIN DIFFERENTIAL INTERFACE

(75) Inventor: Uri Elrich, Matan (IL)

(73) Assignee: Marvell International Ltd., Hamilton (BM)

(*) Notice: Subject to any disclaimer, the term of this patent is extended or adjusted under 35 U.S.C. 154(b) by 2046 days.

(21) Appl. No.: 12/041,483

(22) Filed: Mar. 3, 2008

(65) Prior Publication Data

US 2008/0218237 A1  Sep. 11, 2008

Related U.S. Application Data

(60) Provisional application No. 60/893,009, filed on Mar. 5, 2007.

(51) Int. Cl.
*H03K 5/22* (2006.01)
*G06F 13/40* (2006.01)

(52) U.S. Cl.
CPC .................................. *G06F 13/4072* (2013.01)
USPC .............................. 370/229; 327/75; 327/89

(58) Field of Classification Search
USPC ................. 370/229, 230, 253, 282, 284, 465;
327/74, 333, 71, 89, 103, 127, 359
See application file for complete search history.

(56) References Cited

U.S. PATENT DOCUMENTS

| | | | |
|---|---|---|---|
| 5,166,956 A | 11/1992 | Baltus et al. | |
| 5,294,847 A * | 3/1994 | Grossman et al. | 327/54 |
| 6,188,280 B1 * | 2/2001 | Filip | 330/252 |
| 6,658,612 B1 * | 12/2003 | Park et al. | 714/724 |
| 7,358,753 B2 * | 4/2008 | Tang | 324/750.09 |
| 7,948,810 B1 * | 5/2011 | Tang et al. | 365/189.11 |
| 2006/0055449 A1 * | 3/2006 | Uratani et al. | 327/534 |
| 2012/0049930 A1 * | 3/2012 | Han | 327/434 |

OTHER PUBLICATIONS

Office Action from the Israel Patent Office dated Dec. 20, 2011 for Israel Patent Application No. 189917.

* cited by examiner

*Primary Examiner* — Yemane Mesfin
*Assistant Examiner* — Mon Cheri Davenport

(57) ABSTRACT

A digital interface system that includes a first circuit that transmits a set of voltage levels and a second circuit that receives the set of voltage levels and generates a set of voltage differential levels based on the set of voltage levels. The set of voltage differential levels corresponds to a first predetermined value. Each of the voltage levels is different from another of the voltage levels.

24 Claims, 16 Drawing Sheets

50

| | B1, T1 | B2, T2 | B3, T3 | B4, T4 |
|---|---|---|---|---|
| Permutation 1 | 1 | 0.8 | 0.6 | 0.4 |
| Permutation 2 | 1 | 0.8 | 0.4 | 0.6 |
| Permutation 3 | 1 | 0.6 | 0.8 | 0.4 |
| Permutation 4 | 1 | 0.6 | 0.4 | 0.8 |
| Permutation 5 | 1 | 0.4 | 0.8 | 0.6 |
| Permutation 6 | 1 | 0.4 | 0.6 | 0.8 |
| Permutation 7 | 0.8 | 1 | 0.6 | 0.4 |
| Permutation 8 | 0.8 | 1 | 0.4 | 0.6 |
| Permutation 9 | 0.8 | 0.6 | 1 | 0.4 |
| Permutation 10 | 0.8 | 0.6 | 0.4 | 1 |
| Permutation 11 | 0.8 | 0.4 | 1 | 0.6 |
| Permutation 12 | 0.8 | 0.4 | 0.6 | 1 |
| Permutation 13 | 0.6 | 1 | 0.8 | 0.4 |
| Permutation 14 | 0.6 | 1 | 0.4 | 0.8 |
| Permutation 15 | 0.6 | 0.8 | 1 | 0.4 |
| Permutation 16 | 0.6 | 0.8 | 0.4 | 1 |
| Permutation 17 | 0.6 | 0.4 | 1 | 0.8 |
| Permutation 18 | 0.6 | 0.4 | 0.8 | 1 |
| Permutation 19 | 0.4 | 1 | 0.8 | 0.6 |
| Permutation 20 | 0.4 | 1 | 0.6 | 0.8 |
| Permutation 21 | 0.4 | 0.8 | 1 | 0.6 |
| Permutation 22 | 0.4 | 0.8 | 0.6 | 1 |
| Permutation 23 | 0.4 | 0.6 | 1 | 0.8 |
| Permutation 24 | 0.4 | 0.6 | 0.8 | 1 |

FIG. 4(a)

|  | T1-T2 | T1-T3 | T1-T4 | T2-T3 | T2-T4 | T3-T4 |
|---|---|---|---|---|---|---|
| Permutation 1 | 0.2 | 0.4 | 0.6 | 0.2 | 0.4 | 0.2 |
| Permutation 2 | 0.2 | 0.6 | 0.4 | 0.4 | 0.2 | -0.2 |
| Permutation 3 | 0.4 | 0.2 | 0.6 | -0.2 | 0.2 | 0.4 |
| Permutation 4 | 0.4 | 0.6 | 0.2 | 0.2 | -0.2 | -0.4 |
| Permutation 5 | 0.6 | 0.2 | 0.4 | -0.4 | -0.2 | 0.2 |
| Permutation 6 | 0.6 | 0.4 | 0.2 | -0.2 | -0.4 | -0.2 |
| Permutation 7 | -0.2 | 0.2 | 0.4 | 0.4 | 0.6 | 0.2 |
| Permutation 8 | -0.2 | 0.4 | 0.2 | 0.6 | 0.4 | -0.2 |
| Permutation 9 | 0.2 | -0.2 | 0.4 | -0.4 | 0.2 | 0.6 |
| Permutation 10 | 0.2 | 0.4 | -0.2 | 0.2 | -0.4 | -0.6 |
| Permutation 11 | 0.4 | -0.2 | 0.2 | -0.6 | -0.2 | 0.4 |
| Permutation 12 | 0.4 | 0.2 | -0.2 | -0.2 | -0.6 | -0.4 |
| Permutation 13 | -0.4 | -0.2 | 0.2 | 0.2 | 0.6 | 0.4 |
| Permutation 14 | -0.4 | 0.2 | -0.2 | 0.6 | 0.2 | -0.4 |
| Permutation 15 | -0.2 | -0.4 | 0.2 | -0.2 | 0.4 | 0.6 |
| Permutation 16 | -0.2 | 0.2 | -0.4 | 0.4 | -0.2 | -0.6 |
| Permutation 17 | 0.2 | -0.4 | -0.2 | -0.6 | -0.4 | 0.2 |
| Permutation 18 | 0.2 | -0.2 | -0.4 | -0.4 | -0.6 | -0.2 |
| Permutation 19 | -0.6 | -0.4 | -0.2 | 0.2 | 0.4 | 0.2 |
| Permutation 20 | -0.6 | -0.2 | -0.4 | 0.4 | 0.2 | -0.2 |
| Permutation 21 | -0.4 | -0.6 | -0.2 | -0.2 | 0.2 | 0.4 |
| Permutation 22 | -0.4 | -0.2 | -0.6 | 0.2 | -0.2 | -0.4 |
| Permutation 23 | -0.2 | -0.6 | -0.4 | -0.4 | -0.2 | 0.2 |
| Permutation 24 | -0.2 | -0.4 | -0.6 | -0.2 | -0.4 | -0.2 |

FIG. 4(b)

| 70 | T1-T2 | T1-T3 | T1-T4 | T2-T3 | T2-T4 | T3-T4 | Word | Decimal |
|---|---|---|---|---|---|---|---|---|
| Permutation 1 | 1 | 1 | 1 | 1 | 1 | 1 | 11111 | 63 |
| Permutation 2 | 1 | 1 | 1 | 1 | 1 | 0 | 111110 | 62 |
| Permutation 3 | 1 | 1 | 1 | 0 | 1 | 1 | 111011 | 59 |
| Permutation 4 | 1 | 1 | 1 | 1 | 0 | 0 | 111100 | 60 |
| Permutation 5 | 1 | 1 | 1 | 0 | 0 | 1 | 111001 | 57 |
| Permutation 6 | 1 | 1 | 1 | 0 | 0 | 0 | 111000 | 56 |
| Permutation 7 | 0 | 1 | 1 | 1 | 1 | 1 | 011111 | 31 |
| Permutation 8 | 0 | 1 | 1 | 1 | 1 | 0 | 011110 | 30 |
| Permutation 9 | 1 | 0 | 1 | 0 | 1 | 1 | 101011 | 43 |
| Permutation 10 | 1 | 1 | 0 | 1 | 0 | 0 | 110100 | 52 |
| Permutation 11 | 1 | 0 | 1 | 0 | 0 | 1 | 101001 | 41 |
| Permutation 12 | 1 | 1 | 0 | 0 | 0 | 0 | 110000 | 48 |
| Permutation 13 | 0 | 0 | 1 | 1 | 1 | 1 | 001111 | 15 |
| Permutation 14 | 0 | 1 | 0 | 1 | 1 | 0 | 010110 | 22 |
| Permutation 15 | 0 | 0 | 1 | 0 | 1 | 1 | 001011 | 11 |
| Permutation 16 | 0 | 1 | 0 | 1 | 0 | 0 | 010100 | 20 |
| Permutation 17 | 1 | 0 | 0 | 0 | 0 | 1 | 100001 | 33 |
| Permutation 18 | 1 | 0 | 0 | 0 | 0 | 0 | 100000 | 32 |
| Permutation 19 | 0 | 0 | 0 | 1 | 1 | 1 | 000111 | 7 |
| Permutation 20 | 0 | 0 | 0 | 1 | 1 | 0 | 000110 | 6 |
| Permutation 21 | 0 | 0 | 0 | 0 | 1 | 1 | 000011 | 3 |
| Permutation 22 | 0 | 0 | 0 | 1 | 0 | 0 | 000100 | 4 |
| Permutation 23 | 0 | 0 | 0 | 0 | 0 | 1 | 000001 | 1 |
| Permutation 24 | 0 | 0 | 0 | 0 | 0 | 0 | 000000 | 0 |

FIG. 4(c)

|  | B1, T1 | B2, T2 | B3, T3 |
|---|---|---|---|
| Permutation 1 | 1 | 0.8 | 0.6 |
| Permutation 2 | 1 | 0.6 | 0.8 |
| Permutation 3 | 0.8 | 1 | 0.6 |
| Permutation 4 | 0.8 | 0.6 | 1 |
| Permutation 5 | 0.6 | 1 | 0.8 |
| Permutation 6 | 0.6 | 0.8 | 1 |

FIG. 6(a)

|  | T1-T2 | T1-T3 | T2-T3 |
|---|---|---|---|
| Permutation 1 | 0.2 | 0.4 | 0.2 |
| Permutation 2 | 0.4 | 0.2 | -0.2 |
| Permutation 3 | -0.2 | 0.2 | 0.4 |
| Permutation 4 | 0.2 | -0.2 | -0.4 |
| Permutation 5 | -0.4 | -0.2 | 0.2 |
| Permutation 6 | -0.2 | -0.4 | -0.2 |

FIG. 6(b)

|  | T1-T2 | T1-T3 | T2-T3 | Word | Decimal |
|---|---|---|---|---|---|
| Permutation 1 | 1 | 1 | 1 | 111 | 7 |
| Permutation 2 | 1 | 1 | 0 | 110 | 6 |
| Permutation 3 | 0 | 1 | 1 | 011 | 3 |
| Permutation 4 | 1 | 0 | 0 | 100 | 4 |
| Permutation 5 | 0 | 0 | 1 | 001 | 1 |
| Permutation 6 | 0 | 0 | 0 | 000 | 0 |

FIG. 6(c)

| 110 | Symbol 1 | | | Symbol 2 | | | Distance 1 | | | Distance 2 | | | SUM |
|---|---|---|---|---|---|---|---|---|---|---|---|---|---|
| | T1-T2 | T1-T3 | T2-T3 | T1-T2 | T1-T3 | T2-T3 | T1-T2 | T1-T3 | T2-T3 | T1-T2 | T1-T3 | T2-T3 | SUM |
| 0 | 0.20 | 0.40 | 0.20 | 0.20 | 0.40 | 0.20 | 0.00 | 0.00 | 0.00 | 0.00 | 0.00 | 0.00 | 0.00 |
| 1 | 0.20 | 0.40 | 0.20 | 0.40 | 0.20 | -0.20 | 0.00 | 0.00 | 0.00 | 0.01 | 0.01 | 0.04 | 0.06 |
| 2 | 0.20 | 0.40 | 0.20 | -0.20 | 0.20 | 0.40 | 0.00 | 0.00 | 0.00 | 0.04 | 0.01 | 0.01 | 0.06 |
| 3 | 0.20 | 0.40 | 0.20 | 0.20 | -0.20 | -0.40 | 0.00 | 0.00 | 0.00 | 0.00 | 0.09 | 0.09 | 0.18 |
| 4 | 0.20 | 0.40 | 0.20 | -0.40 | -0.20 | 0.20 | 0.00 | 0.00 | 0.00 | 0.09 | 0.09 | 0.00 | 0.18 |
| 5 | 0.20 | 0.40 | 0.20 | -0.20 | -0.40 | -0.20 | 0.00 | 0.00 | 0.00 | 0.04 | 0.16 | 0.04 | 0.24 |
| 6 | 0.40 | 0.20 | -0.20 | 0.20 | 0.40 | 0.20 | 0.01 | 0.01 | 0.04 | 0.00 | 0.00 | 0.00 | 0.06 |
| 7 | 0.40 | 0.20 | -0.20 | 0.40 | 0.20 | -0.20 | 0.01 | 0.01 | 0.04 | 0.01 | 0.01 | 0.04 | 0.12 |
| 8 | 0.40 | 0.20 | -0.20 | -0.20 | 0.20 | 0.40 | 0.01 | 0.01 | 0.04 | 0.04 | 0.01 | 0.01 | 0.12 |
| 9 | 0.40 | 0.20 | -0.20 | 0.20 | -0.20 | -0.40 | 0.01 | 0.01 | 0.04 | 0.00 | 0.09 | 0.09 | 0.24 |
| 10 | 0.40 | 0.20 | -0.20 | -0.40 | -0.20 | 0.20 | 0.01 | 0.01 | 0.04 | 0.09 | 0.09 | 0.00 | 0.24 |
| 11 | 0.40 | 0.20 | -0.20 | -0.20 | -0.40 | -0.20 | 0.01 | 0.01 | 0.04 | 0.04 | 0.16 | 0.04 | 0.30 |
| 12 | -0.20 | 0.20 | 0.40 | 0.20 | 0.40 | 0.20 | 0.04 | 0.01 | 0.01 | 0.00 | 0.00 | 0.00 | 0.06 |
| 13 | -0.20 | 0.20 | 0.40 | 0.40 | 0.20 | -0.20 | 0.04 | 0.01 | 0.01 | 0.01 | 0.01 | 0.04 | 0.12 |
| 14 | -0.20 | 0.20 | 0.40 | -0.20 | 0.20 | 0.40 | 0.04 | 0.01 | 0.01 | 0.04 | 0.01 | 0.01 | 0.12 |
| 15 | -0.20 | 0.20 | 0.40 | 0.20 | -0.20 | -0.40 | 0.04 | 0.01 | 0.01 | 0.00 | 0.09 | 0.09 | 0.24 |
| 16 | -0.20 | 0.20 | 0.40 | -0.40 | -0.20 | 0.20 | 0.04 | 0.01 | 0.01 | 0.09 | 0.09 | 0.00 | 0.24 |
| 17 | -0.20 | 0.20 | 0.40 | -0.20 | -0.40 | -0.20 | 0.04 | 0.01 | 0.01 | 0.04 | 0.16 | 0.04 | 0.30 |
| 18 | 0.20 | -0.20 | -0.40 | 0.20 | 0.40 | 0.20 | 0.00 | 0.09 | 0.09 | 0.00 | 0.00 | 0.00 | 0.18 |
| 19 | 0.20 | -0.20 | -0.40 | 0.40 | 0.20 | -0.20 | 0.00 | 0.09 | 0.09 | 0.01 | 0.01 | 0.04 | 0.24 |
| 20 | 0.20 | -0.20 | -0.40 | -0.20 | 0.20 | 0.40 | 0.00 | 0.09 | 0.09 | 0.04 | 0.01 | 0.01 | 0.24 |
| 21 | 0.20 | -0.20 | -0.40 | 0.20 | -0.20 | -0.40 | 0.00 | 0.09 | 0.09 | 0.00 | 0.09 | 0.09 | 0.36 |
| 22 | 0.20 | -0.20 | -0.40 | -0.40 | -0.20 | 0.20 | 0.00 | 0.09 | 0.09 | 0.09 | 0.09 | 0.00 | 0.36 |
| 23 | 0.20 | -0.20 | -0.40 | -0.20 | -0.40 | -0.2 | 0.00 | 0.09 | 0.09 | 0.04 | 0.16 | 0.04 | 0.42 |
| 24 | -0.40 | -0.20 | 0.20 | 0.20 | 0.40 | 0.20 | 0.09 | 0.09 | 0.00 | 0.00 | 0.00 | 0.00 | 0.18 |
| 25 | -0.40 | -0.20 | 0.20 | 0.40 | 0.20 | -0.20 | 0.09 | 0.09 | 0.00 | 0.01 | 0.01 | 0.04 | 0.24 |
| 26 | -0.40 | -0.20 | 0.20 | -0.20 | 0.20 | 0.40 | 0.09 | 0.09 | 0.00 | 0.04 | 0.01 | 0.01 | 0.24 |
| 27 | -0.40 | -0.20 | 0.20 | 0.20 | -0.20 | -0.40 | 0.09 | 0.09 | 0.00 | 0.00 | 0.09 | 0.09 | 0.36 |
| 28 | -0.40 | -0.20 | 0.20 | -0.40 | -0.20 | 0.20 | 0.09 | 0.09 | 0.00 | 0.09 | 0.09 | 0.00 | 0.36 |
| 29 | -0.40 | -0.20 | 0.20 | -0.20 | -0.40 | -0.20 | 0.09 | 0.09 | 0.00 | 0.04 | 0.16 | 0.04 | 0.42 |
| 30 | -0.20 | -0.40 | -0.20 | 0.20 | 0.40 | 0.20 | 0.04 | 0.16 | 0.04 | 0.00 | 0.00 | 0.00 | 0.24 |
| 31 | -0.20 | -0.40 | -0.20 | 0.40 | 0.20 | -0.20 | 0.04 | 0.16 | 0.04 | 0.01 | 0.01 | 0.04 | 0.30 |
| 32 | -0.20 | -0.40 | -0.20 | -0.20 | 0.20 | 0.40 | 0.04 | 0.16 | 0.04 | 0.04 | 0.01 | 0.01 | 0.30 |
| 33 | -0.20 | -0.40 | -0.20 | 0.20 | -0.20 | -0.40 | 0.04 | 0.16 | 0.04 | 0.00 | 0.09 | 0.09 | 0.42 |
| 34 | -0.20 | -0.40 | -0.20 | -0.40 | -0.20 | 0.20 | 0.04 | 0.16 | 0.04 | 0.09 | 0.09 | 0.00 | 0.42 |
| 35 | -0.20 | -0.40 | -0.20 | -0.20 | -0.40 | -0.20 | 0.04 | 0.16 | 0.04 | 0.04 | 0.16 | 0.04 | 0.48 |

FIG. 7(a)

|   | Symbol 1 | | | Symbol 2 | | | Distance 1 | | | Distance 2 | | | SUM |
|---|---|---|---|---|---|---|---|---|---|---|---|---|---|
|   | T1-T2 | T1-T3 | T2-T3 | T1-T2 | T1-T3 | T2-T3 | T1-T2 | T1-T3 | T2-T3 | T1-T2 | T1-T3 | T2-T3 |   |
| 0 | 0.2 | 0.4 | 0.2 | 0.2 | 0.4 | 0.2 | 0 | 0 | 0 | 0 | 0 | 0 | 0 |
| 1 | 0.2 | 0.4 | 0.2 | 0.4 | 0.2 | -0.2 | 0 | 0 | 0 | 0 | 0 | 0.04 | 0.04 |
| 2 | 0.2 | 0.4 | 0.2 | -0.2 | 0.2 | 0.4 | 0 | 0 | 0 | 0.04 | 0 | 0 | 0.04 |
| 3 | 0.2 | 0.4 | 0.2 | 0.2 | -0.2 | -0.4 | 0 | 0 | 0 | 0 | 0.16 | 0.04 | 0.2 |
| 4 | 0.2 | 0.4 | 0.2 | -0.4 | -0.2 | 0.2 | 0 | 0 | 0 | 0.04 | 0.16 | 0 | 0.2 |
| 5 | 0.2 | 0.4 | 0.2 | -0.2 | -0.4 | -0.2 | 0 | 0 | 0 | 0.04 | 0.16 | 0.04 | 0.24 |
| 6 | 0.4 | 0.2 | -0.2 | 0.2 | 0.4 | 0.2 | 0 | 0 | 0.04 | 0 | 0 | 0 | 0.04 |
| 7 | 0.4 | 0.2 | -0.2 | 0.4 | 0.2 | -0.2 | 0 | 0 | 0.04 | 0 | 0 | 0.04 | 0.08 |
| 8 | 0.4 | 0.2 | -0.2 | -0.2 | 0.2 | 0.4 | 0 | 0 | 0.04 | 0.04 | 0 | 0 | 0.08 |
| 9 | 0.4 | 0.2 | -0.2 | 0.2 | -0.2 | -0.4 | 0 | 0 | 0.04 | 0 | 0.16 | 0.04 | 0.24 |
| 10 | 0.4 | 0.2 | -0.2 | -0.4 | -0.2 | 0.2 | 0 | 0 | 0.04 | 0.04 | 0.16 | 0 | 0.24 |
| 11 | 0.4 | 0.2 | -0.2 | -0.2 | -0.4 | -0.2 | 0 | 0 | 0.04 | 0.04 | 0.16 | 0.04 | 0.28 |
| 12 | -0.2 | 0.2 | 0.4 | 0.2 | 0.4 | 0.2 | 0.04 | 0 | 0 | 0 | 0 | 0 | 0.04 |
| 13 | -0.2 | 0.2 | 0.4 | 0.4 | 0.2 | -0.2 | 0.04 | 0 | 0 | 0 | 0 | 0.04 | 0.08 |
| 14 | -0.2 | 0.2 | 0.4 | -0.2 | 0.2 | 0.4 | 0.04 | 0 | 0 | 0.04 | 0 | 0 | 0.08 |
| 15 | -0.2 | 0.2 | 0.4 | 0.2 | -0.2 | -0.4 | 0.04 | 0 | 0 | 0 | 0.16 | 0.04 | 0.24 |
| 16 | -0.2 | 0.2 | 0.4 | -0.4 | -0.2 | 0.2 | 0.04 | 0 | 0 | 0.04 | 0.16 | 0 | 0.24 |
| 17 | -0.2 | 0.2 | 0.4 | -0.2 | -0.4 | -0.2 | 0.04 | 0 | 0 | 0.04 | 0.16 | 0.04 | 0.28 |
| 18 | 0.2 | -0.2 | -0.4 | 0.2 | 0.4 | 0.2 | 0 | 0.16 | 0.04 | 0 | 0 | 0 | 0.2 |
| 19 | 0.2 | -0.2 | -0.4 | 0.4 | 0.2 | -0.2 | 0 | 0.16 | 0.04 | 0 | 0 | 0.04 | 0.24 |
| 20 | 0.2 | -0.2 | -0.4 | -0.2 | 0.2 | 0.4 | 0 | 0.16 | 0.04 | 0.04 | 0 | 0 | 0.24 |
| 21 | 0.2 | -0.2 | -0.4 | 0.2 | -0.2 | -0.4 | 0 | 0.16 | 0.04 | 0 | 0.16 | 0.04 | 0.4 |
| 22 | 0.2 | -0.2 | -0.4 | -0.4 | -0.2 | 0.2 | 0 | 0.16 | 0.04 | 0.04 | 0.16 | 0 | 0.4 |
| 23 | 0.2 | -0.2 | -0.4 | -0.2 | -0.4 | -0.2 | 0 | 0.16 | 0.04 | 0.04 | 0.16 | 0.04 | 0.44 |
| 24 | -0.4 | -0.2 | 0.2 | 0.2 | 0.4 | 0.2 | 0.04 | 0.16 | 0 | 0 | 0 | 0 | 0.2 |
| 25 | -0.4 | -0.2 | 0.2 | 0.4 | 0.2 | -0.2 | 0.04 | 0.16 | 0 | 0 | 0 | 0.04 | 0.24 |
| 26 | -0.4 | -0.2 | 0.2 | -0.2 | 0.2 | 0.4 | 0.04 | 0.16 | 0 | 0.04 | 0 | 0 | 0.24 |
| 27 | -0.4 | -0.2 | 0.2 | 0.2 | -0.2 | -0.4 | 0.04 | 0.16 | 0 | 0 | 0.16 | 0.04 | 0.4 |
| 28 | -0.4 | -0.2 | 0.2 | -0.4 | -0.2 | 0.2 | 0.04 | 0.16 | 0 | 0.04 | 0.16 | 0 | 0.4 |
| 29 | -0.4 | -0.2 | 0.2 | -0.2 | -0.4 | -0.2 | 0.04 | 0.16 | 0 | 0.04 | 0.16 | 0.04 | 0.44 |
| 30 | -0.2 | -0.4 | -0.2 | 0.2 | 0.4 | 0.2 | 0.04 | 0.16 | 0.04 | 0 | 0 | 0 | 0.24 |
| 31 | -0.2 | -0.4 | -0.2 | 0.4 | 0.2 | -0.2 | 0.04 | 0.16 | 0.04 | 0 | 0 | 0.04 | 0.28 |
| 32 | -0.2 | -0.4 | -0.2 | -0.2 | 0.2 | 0.4 | 0.04 | 0.16 | 0.04 | 0.04 | 0 | 0 | 0.28 |
| 33 | -0.2 | -0.4 | -0.2 | 0.2 | -0.2 | -0.4 | 0.04 | 0.16 | 0.04 | 0 | 0.16 | 0.04 | 0.44 |
| 34 | -0.2 | -0.4 | -0.2 | -0.4 | -0.2 | 0.2 | 0.04 | 0.16 | 0.04 | 0.04 | 0.16 | 0 | 0.44 |
| 35 | -0.2 | -0.4 | -0.2 | -0.2 | -0.4 | -0.2 | 0.04 | 0.16 | 0.04 | 0.04 | 0.16 | 0.04 | 0.48 |

FIG. 7(b)

MULTI-LEVEL MULTI-PIN DIFFERENTIAL INTERFACE

RELATED APPLICATION

This application claims the benefit of U.S. Provisional Application No. 60/893,009, filed on Mar. 5, 2007, which is incorporated herein by reference.

BACKGROUND

1. Technical Field

The present disclosure relates to digital interfaces and, more particularly, to efficient digital interfaces useful in wireless communication devices.

2. Related Art

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Various communication and computer systems transfer digital data between modules. Wireless communication devices for example typically include a baseband circuit and a radio frequency (RF) circuit that communicate with each other during a transmit operation and/or a receive operation. During a transmit operation of the wireless device, the baseband circuit processes signals prior to the RF circuit modulating (i.e., shifting) the signals to a higher frequency for transmission. During a receive operation of the wireless device, the RF circuit demodulates a received signal prior to processing by the baseband circuit.

The baseband circuit and the RF circuit communicate via a digital interface. The digital interface generally provides a bandwidth enabling robust data transmissions for current cellular standards. In order to meet the increasing demand of data transmission rates, next generation cellular standards for example will require much higher bit rates (e.g. five times current bandwidths). One alternative to meet the demand for increased bandwidth would be to significantly increase the number of pins and transmission lines across the digital interface.

BRIEF SUMMARY

The present disclosure is defined by the following claims, and nothing in this section should be taken as a limitation on those claims.

By way of introduction, the preferred embodiments below provide a digital interface system that includes a first circuit that transmits a set of voltage levels and a second circuit that receives the set of voltage levels and generates a set of voltage differential levels based on the set of voltage levels. The set of voltage differential levels corresponds to a first predetermined value. Each of the voltage levels is different from another of the voltage levels.

A digital interface system that includes a first means for transmitting a set of voltage levels and a second means for receiving the set of voltage levels and for generating a set of voltage differential levels based on the set of voltage levels, wherein the set of voltage differential levels corresponds to a first predetermined value. Each of the voltage levels is different from another of the voltage levels.

In other features, the first means electrically communicates with the second means via a first plurality of pins of the first means and a second plurality of pins of the second means. The second means generates the plurality of voltage differential levels during a symbol period of operation of the digital interface system. Each of the first plurality of pins and the second plurality of pins includes at least three pins.

In other features, the first means respectively transmits a first voltage level, a second voltage level, and a third voltage level at a first pin, a second pin, and a third pin of the first plurality of pins and the second means respectively receives the first voltage level, the second voltage level, and the third voltage level at a first pin, a second pin, and a third pin of the second plurality of pins. The second means selectively generates the set of voltage differential levels based on differences among the first voltage level, the second voltage level, and the third voltage level with each other. The second means generates a plurality of sets of voltage differential levels when the first means switches the transmission of two of the first voltage level, the second voltage level, and the third voltage level at the first plurality of pins, wherein each of the plurality of sets of voltage differential levels corresponds to one of a plurality of predetermined values.

In other features, the second means generates the set of voltage differential levels during adjacent symbol periods of operation of the digital interface system. Each of the set of voltage differential levels corresponds to a difference in voltage levels in selected pairs of voltage levels. The selected pairs of voltage levels correspond to all possible pairs of voltage levels among the set of voltage levels.

In other features, the digital interface system is included within user equipment for use on a cellular network. The user equipment includes at least one of a desktop computer, a personal digital assistant, a mobile phone, a laptop, a personal computer, a printer, a digital camera and an internet protocol phone.

Other systems, methods, and features of the disclosure will be, or will become, apparent to one with skill in the art upon examination of the following figures and detailed description. It is intended that all such additional systems, methods, features and advantages be included within this description, be within the scope of the disclosure, and be protected by the following claims.

The preferred embodiments will now be described with reference to the attached drawings.

BRIEF DESCRIPTION OF THE DRAWINGS

FIG. 4(a) is a table illustrating exemplary permutations generated by the first exemplary implementation according to the present disclosure;

FIG. 4(b) is a table illustrating various voltage differential levels corresponding to the exemplary permutations of the first implementation according to the present disclosure;

FIG. 4(c) is a table illustrating binary values that respectively correspond to the voltage differential levels of the first implementation according to the present disclosure;

FIG. 6(a) is a table illustrating exemplary permutations generated by the second exemplary implementation according to the present disclosure;

FIG. 6(b) is a table illustrating various voltage differential levels corresponding to the exemplary permutations of the second implementation according to the present disclosure;

FIG. 6(c) is a table illustrating binary values that respectively correspond to the voltage differential levels of the second implementation according to the present disclosure;

FIG. 7(a) is a table illustrating examples of various voltage differential levels corresponding to the exemplary permutations of the second implementation when two symbols are decoded simultaneously according to the present disclosure;

FIG. 7(b) is a table illustrating examples of various voltage differential levels corresponding to the exemplary permutations of the second implementation when two symbols are decoded simultaneously according to the present disclosure;

DETAILED DESCRIPTION OF THE PRESENTLY PREFERRED EMBODIMENTS

The disclosure can be better understood with reference to the following drawings and description. The components in the figures are not necessarily to scale, emphasis instead being placed upon illustrating the principles of the disclosure. Moreover, in the figures, like referenced numerals designate corresponding parts or elements throughout the different views. The following description is merely exemplary in nature and is in no way intended to limit the disclosure, its application, or uses. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

By way of introduction, the embodiments described herein are related to serial digital interfaces of wireless network devices although the principles disclosed herein are generally applicable to devices including serial digital interfaces. More particularly, a network interface includes a baseband processor (BBP) and a radio frequency (RF) transceiver that communicate data bidirectionally via a digital interface. The present disclosure describes a digital interface system that increases the bandwidth across the digital interface of a network interface, thereby increasing the data throughput and efficiency of data transmissions during transmit and receive operations of the network interface.

Figure 1:
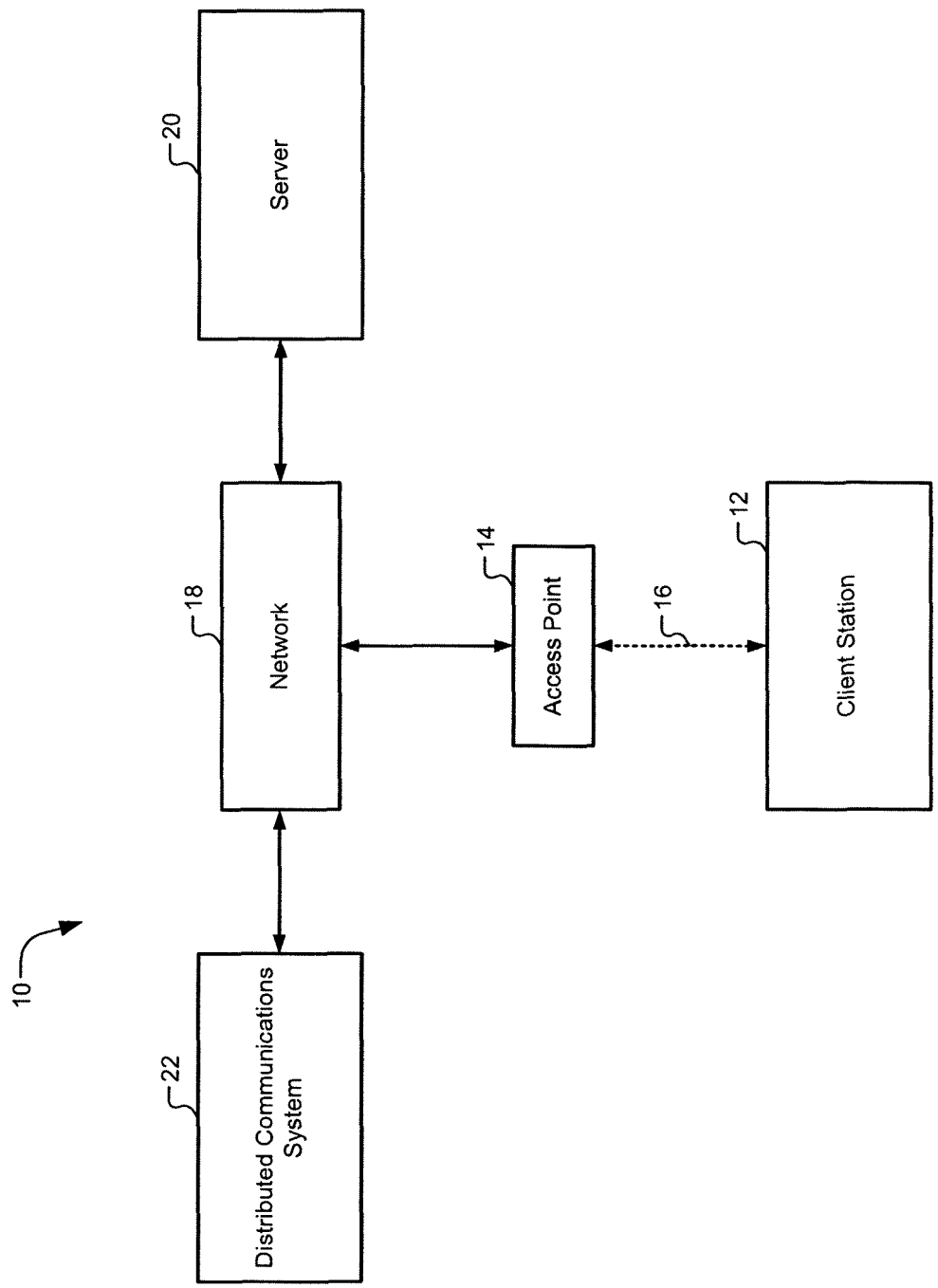
FIG. 1 is a functional block diagram of an exemplary wireless network according to the present disclosure.

Referring now to FIG. 1, an exemplary wireless network 10 is shown. Wireless communications of the wireless network 10 can be compliant with various protocols including at least one of the Institute of Electrical and Electronics Engineers (IEEE) standards 802.11, 802.11a, 802.11b, 802.11g, 802.11h, 802.11n, 802.16, 802.16a, 802.16e, 802.16-2004, and 802.20, and/or the Bluetooth standard published by the Bluetooth Special Interest Group (SIG). The aforementioned standards are hereby incorporated by reference in their entirety.

The wireless network 10 includes at least one client station 12 and at least one access point 14. The access point 14 connects the client station 12 (i.e., wireless communication devices) to form the wireless network 10. Typically, the access point 14 connects to a network 18 (e.g., a wired network) and can relay data between the client station 12 and various wired devices (not shown) of the network 18. The client station 12 implements the digital interface system of the present disclosure. The client station 12 may include, but is not limited to, a desktop computer, a personal digital assistant (PDA), a mobile phone, a laptop, a personal computer (PC), a printer, a digital camera, an internet protocol (IP) phone.

In the present embodiment, the client station 12 and the access point 14 transmit and receive wireless signals 16 to enable communication within the wireless network 10. The access point 14 represents a node in the network 18 and may include, but is not limited to, a network analyzer that can detect and log data transmitted over a digital network or part of a network. The network 18 may be a local area network (LAN), a wide area network (WAN), or another network configuration. The network 18 may include other nodes such as a server 20 and may be connected to a distributed communications system 22 such as the Internet.

Figure 2:
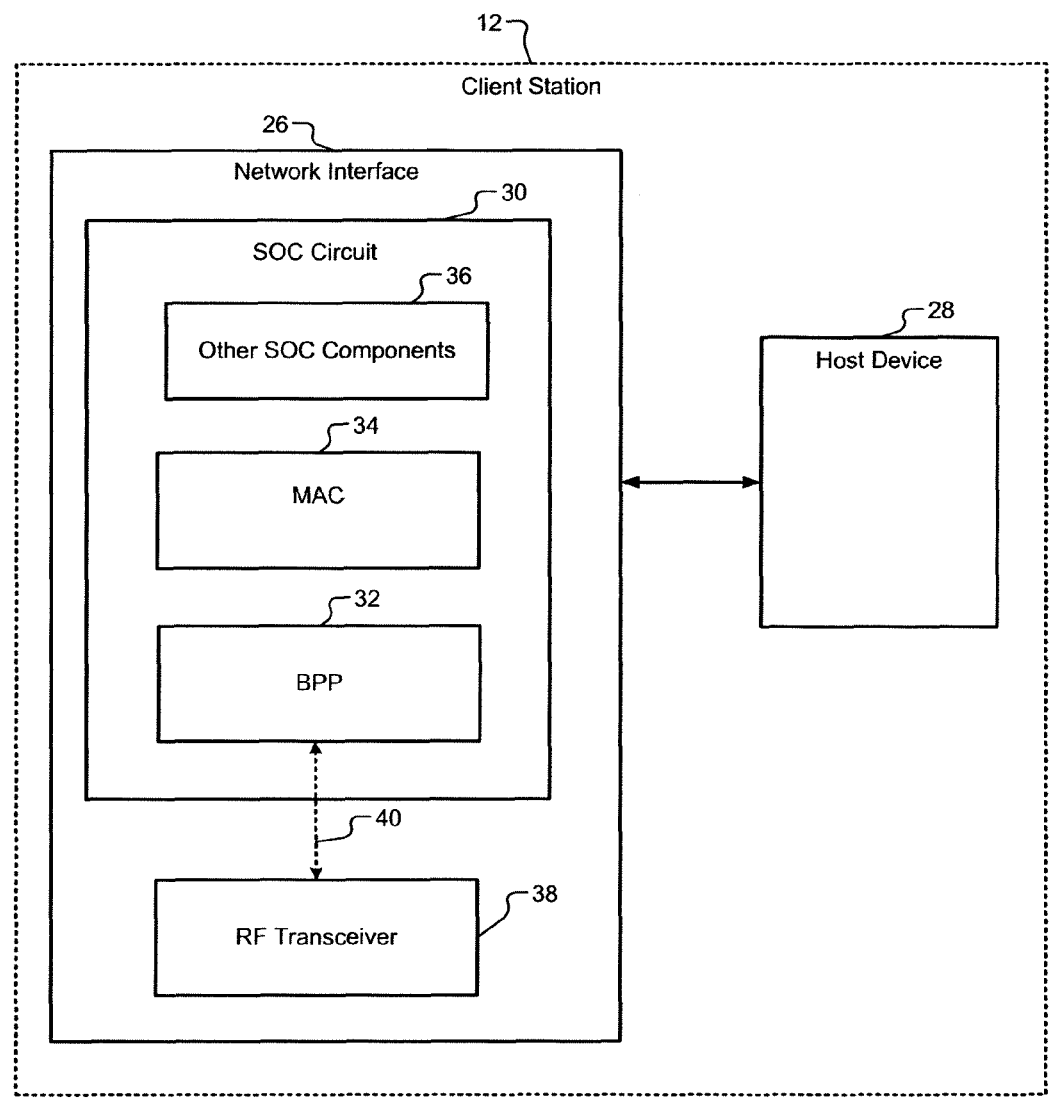
FIG. 2 is a functional block diagram of an exemplary client station including a network interface and host device according to the present disclosure.

Referring now to FIG. 2, the client station 12 is shown in more detail. The client station 12 may include, but is not limited to, various types of user equipment such as a desktop computer, a personal digital assistant, a mobile phone, a laptop, a personal computer, a printer, a digital camera and/or an internet protocol phone. The client station 12 implements the differential digital interface system and is shown to include a network interface 26 and a host device 28. A SOC circuit 30 of the network interface 26 includes a baseband processor (BBP) 32, a media access control (MAC) device 34, and other SOC components, identified collectively at 36, such as interfaces, firmware, memory, and/or processors. A radio frequency (RF) transceiver 38 along with the BBP 32 communicates with the MAC device 34. BBP 32 processes signals received from and/or transmitted to the RF transceiver 38. The RF transceiver 38 modulates signals received from the BBP 32 and demodulates signals prior to transmitting the signals to the BBP 32. The BBP 32 and the RF transceiver 38 communicate data bidirectionally via a differential digital interface 40.

The RF transceiver 38 transmits/receives data to/from various access points in the exemplary wireless network 10. The present implementation illustrates a wireless local area network (WLAN) system, though those skilled in the art will appreciate that various other implementations of the differential digital interface system are contemplated within other wireless network configurations such as a Worldwide Interoperability for Microwave Access (WiMAX) and Bluetooth.

Figure 3:
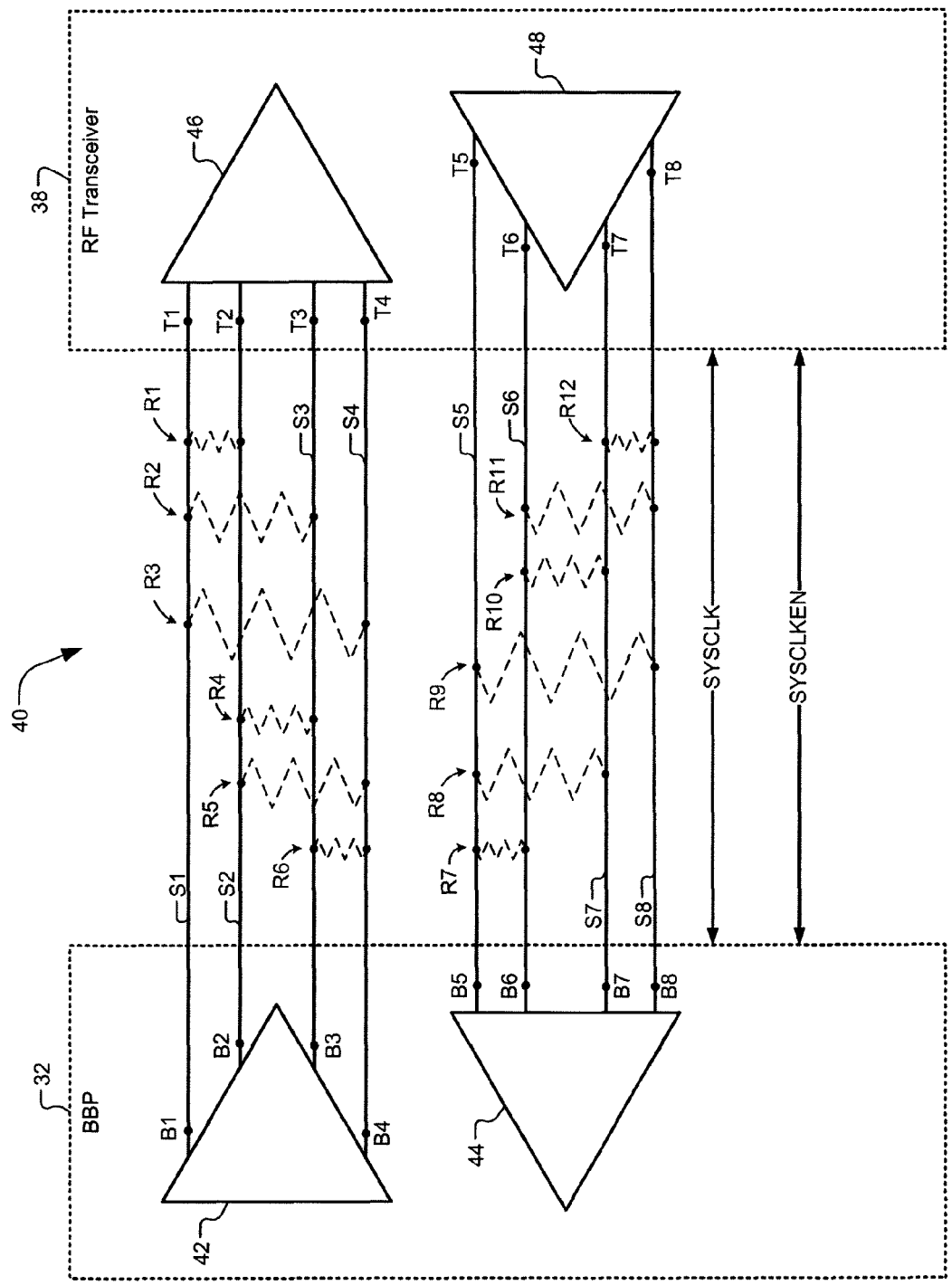
FIG. 3 is a functional block diagram of an exemplary first implementation of a digital interface system according to the present disclosure.

Referring to FIG. 3, an exemplary "four-pin" implementation of the differential digital interface 40 between the BBP 32 and the RF transceiver 38 is shown in more detail. The differential digital interface 40 implements the differential digital interface system of present disclosure. The BBP 32 includes a line driver 42 coupled to external pins B1, B2, B3, and B4, and a line receiver 44 coupled to external pins B5, B6, B7, and B8, referred to collectively as the BBP pins. Similarly, the RF transceiver 38 includes a line receiver 46 coupled to external pins T1, T2, T3, and T4 and a line driver 48 coupled to external pins T5, T6, T7, and T8 referred to collectively as the RF transceiver pins. In various embodiments, the line receivers 42 and 46 may include binary differential voltage comparators though other types of comparators are contemplated. Additionally, the BBP 32 and the RF transceiver 38 each include a phase locked loop (PLL) that operates at approximately 1248 Mega Hertz, for example.

The differential digital interface 40 is shown to include lines/signals S1, S2, . . . S8 as well as signals SYSCLOCK and SYSCLKEN. Various other lines/signals included within the differential digital interface 40 are contemplated by the present disclosure. The lines S1, S2, . . . S8 carry streaming data across the differential digital interface 40. The signals SYSCLOCK and SYSCLKEN are used as timing references to enable digital data transmission over the differential digital interface 40. The RF transceiver 38 generates the signal SYSCLOCK while the signal SYSCLKEN is asserted. In the present embodiment, the signal SYSCLOCK includes a nominal frequency of approximately 26 MHz although various other frequencies are contemplated.

For the sake of simplicity and brevity, the present disclosure will discuss data communication between the line driver 42 of the BBP 32 and the line receiver 46 of the RF transceiver 38 (i.e., a transmit operation) via lines S1, S2, S3 and S4, though those skilled in the art will appreciate that the line driver 48 of the RF transceiver 38 and the line receiver 44 of the BBP 32 communicate in similar fashion over lines S5, S6, S7, and S8 during a receive operation over the differential digital interface system.

The lines S1, S2, S3, and S4 are respectively coupled to the external pins B1, B2, B3, and B4 at a first end and external pins T1, T2, T3, and T4 at a second end. The BBP 32 transmits a distinct voltage level over each of the lines (i.e., signals) S1, S2, S3, and S4. The external pins B1, B2, B3, and B4 communicate with the external pins T1, T2, T3, and T4, respectively. For example, the RF transceiver 38 receives a signal at the external pin T1 when the BBP 32 outputs the signal at the external pin B1. The transmission of signals from the RF transceiver 38 to the BBP 32 functions in similar fashion. Although in the present implementation the BBP pins and RF transceiver pins are depicted to include four pins for transmission at each of the lines receivers 46 and 44 and the line drivers 42 and 48, a variable number of BBP pins and RF transceiver pins are contemplated.

For merely explanatory purposes, the differential digital interface 40 is further shown to include resistors R1, R2, . . . R12, referred to collectively as the resistors, symbolizing the existence of voltage potentials across each of the resistors. In other words, each of the resistors represents a voltage differential level between the respective lines coupled to each end of the resistor. For example, the resistor R1 represents a voltage differential level between the line S1 and the line S2 and the resistor R5 represents a voltage differential level between the lines S2 and S4.

In the present implementation, the BBP 32 transmits pulses having distinct voltage levels over each of the lines S1, S2, S3, and S4. In other words, each of the resistors represents a voltage differential level between a selected pair of lines (i.e., a voltage differential between a selected pair of voltage levels). Therefore each of the voltage differential levels between various pairs of the lines S1, S2, S3 and S4 detected at the external pins T1, T2, T3, and T4 are distinct from each other. The BBP 32 and the RF transceiver 38 utilize various combinations of voltage differential levels to communicate data via the differential digital interface 40.

During a transmit operation, the line receiver 46 calculates a unique set, or "permutation", of voltage differential levels using a binary differential voltage comparator for example in order to determine data signaled from BBP 32. The unique set of voltage differentials is calculated based on voltage levels detected at the external pins T1, T2, T3, and T4 during each symbol period of transmission. Upon identifying the permutation transmitted from the BBP 32, the RF transceiver 38 determines a predetermined value of data that corresponds to the identified permutation based on a predetermined look-up table (not shown). The RF transceiver 38 can detect additional permutations (i.e., additional predetermined values) based on the same set of voltage levels when the BBP 32 switches the voltage levels transmitted at the pins B1, B2, B3, and B4. More specifically, the BBP 32 switches the voltage levels over the pins B1, B2, B3, and B4 such that voltage levels on at least two of the pins B1, B2, B3 and B4 differ from voltage levels transmitted on the same pins during a transmission involving another permutation. As such, various other unique sets of voltage differential levels may be calculated utilizing the same set of voltage levels transmitted by the BBP 32. The present disclosure contemplates calculating all possible sets of voltage differential levels based on a single set of voltage levels transmitted by the BBP 32. In other words, the present disclosure contemplates the possibility of utilizing all possible pairs of voltage levels among a given set of voltage levels, although subsets of all possible pairs of voltage levels may also be utilized.

As previously mentioned, the BBP 32 transmits pulses having distinct voltage levels over each of the lines S1, S2, S3, and S4 for each of the various permutations. In the present implementation depicted in FIG. 3, the differential digital interface 40 includes four lines (i.e., lines S1, S2, S3, and S4) for transmission. Each of the lines S1, S2, S3, and S4 transmits one of four different voltage levels. As a result, the RF transceiver 38 can generate 24 different permutations (i.e., 24 predetermined characters) using a given set of voltage levels which translates to approximately 4.58 bits of data throughput, thereby substantially enhancing the data rate over the differential digital interface 40 while decreasing the effective jitter over a frame of data. The operation of the four-pin implementation of the differential digital interface 40 will be discussed in further detail below.

During a transmit operation, the RF transceiver 38 may decode adjacent symbol periods simultaneously, thereby effectively receiving approximately 9 bits of information. In other words, two transmissions of approximately 4.58 bits of data are received together. The BBP 32 and the RF transceiver 38 may each include for example an encoder (not shown) and a decoder (not shown) such as an analog-to-digital converter for encoding the absolute levels of the voltage levels and decoding the various voltage differential levels, respectively.

Now referring to FIG. 4(a), a table 50 illustrating examples of absolute levels of voltage levels associated with the 24 permutations of the four-pin implementation during a single symbol period is shown. As described above in FIG. 3, each permutation corresponds to distinct set of voltage levels that differ from a set of voltage levels corresponding to another permutation in that the voltage levels on at least two pins (i.e., transmission lines) are switched. For example, the BBP 32 respectively transmits voltage levels 1 Volt (V), 0.8V, 0.6V, and 0.4V for example at the external pins B1, B2, B3, and B4 during a transmit operation corresponding to permutation 1. In other words, the external pins T1, T2, T3, and T4 respectively receive the voltage levels 1V, 0.8V, 0.6V, and 0.4V. In contrast, the BBP 32 respectively transmits exemplary voltage levels 1V, 0.6V, 0.8V, and 0.4V at the external pins B1, B2, B3, and B4 during a transmit operation corresponding to permutation 3. As illustrated by the present example, the voltage levels at the external pin B1 of permutation 1 and permutation 3 differ and the voltage levels at the external pin B3 of permutation 1 and permutation 3 differ.

Referring now to FIGS. 4(a) and 4(b), a table 60 illustrating examples of various voltage differential levels corresponding to the 24 permutations of the four-pin implementation is shown. As mentioned above, each permutation corresponds to a unique set of voltage differential levels detected by the RF transceiver 38 at the external pins T1, T2, T3, and T4. For example, the RF transceiver 38 detects the existence of permutation 1 when the voltage differential levels between the external pins T1 and T2, T2 and T3, T1 and T4, T2 and T3, T2 and T4, and T3 and T4 equal 0.2V, 0.4V, 0.6V, 0.2V, 0.4V, and 0.2V, respectively.

Referring now to FIGS. 4(b) and 4(c), a table 70 illustrating examples of binary values that respectively correspond to the voltage differential levels of FIG. 4(b) is shown in more detail. In the present implementation, a decoder such as a zero-crossing decoder generates the binary values based on decoding the sign of each respective voltage differential level of FIG. 4(b). In other words, when a voltage differential level equals a positive value (e.g., 0.2V), the decoder generates a "1". However, when a voltage differential equals a negative value (e.g., −0.6V), the decoder generates a "0". It will be appreciated that various other decoders are anticipated by the present disclosure.

For example, the decoder generates a digital word of "111011" based on a set of voltage differential levels including 0.4V, 0.2V, 0.6V, −0.2V, 0.2V, and 0.4V that corresponds to the permutation 3. As discussed above, each permutation additionally corresponds to a predetermined value. In the present example, the permutation 3 corresponds to a decimal value of "59". Various other set of predetermined values are contemplated by the present disclosure.

Figure 5:
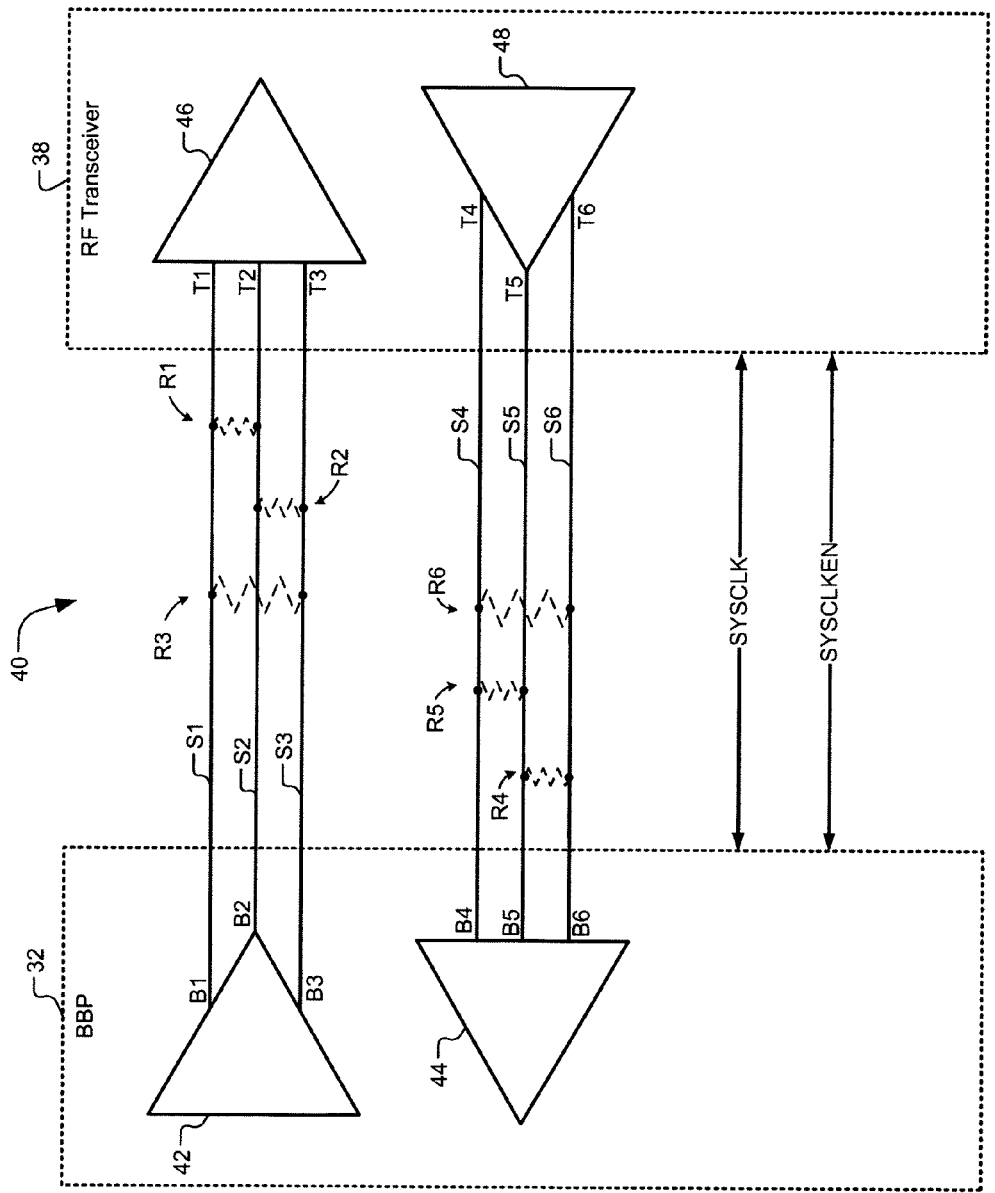
FIG. 5 is a functional block diagram of an exemplary second implementation of the digital interface system according to the present disclosure.

Referring now to FIG. 5, an exemplary "three-pin" implementation of the differential digital interface 40 between the BBP 32 and the RF transceiver 38 is shown. As mentioned above, a variable number of BBP pins and RF transceiver pins are contemplated by the present disclosure. In the present implementation, the BBP pins include the external pins B1, B2, and B3 coupled to the line driver 42 and the external pins B4, B5, and B6 coupled to the line receiver 44. The RF transceiver pins include the external pins T1, T2, and T3 coupled to the line receiver 46 and the external pins T4, T5, T6 coupled to the line driver 48.

Like the four-pin implementation of FIG. 3, the present implementation includes signals SYSCLOCK and SYSCLKEN. The differential digital interface 40 includes lines S1, . . . , and S6 for communicating data across the differential digital interface 40. For the sake of simplicity and brevity, the present implementation will discuss the operation between the line driver 42 of the BBP 32 and the line receiver 46 of the RF transceiver 38 via lines S1, S2, and S3 (i.e. a transmit operation) though those skilled in the art will appreciate on the basis of the above description that the line driver 48 of the RF transceiver 38 and the line receiver 44 of the BBP 32 communicate in similar fashion over lines S4, S5, and S6 during a receive operation over the differential digital interface system.

The lines S1, S2, and S3 are respectively coupled to the external pins B1, B2, and B3 at the first end and the external pins T1, T2, and T3 at the second end. Like the four-pin implementation, the BBP 32 transmits a distinct voltage level over each of the lines (i.e., signals) S1, S2, and S3. Similarly, the external pins B1, B2, and B3 communicate with the external pins T1, T2, and T3, respectively.

The resistors of the differential digital interface 40 of the three-pin implementation symbolically include resistors R1, . . . , and R6. In the present implementation, the BBP 32 transmits pulses having distinct voltage levels over each of the lines S1, S2, and S3. As a result, each of the voltage differential levels between various pairs of the lines S1, S2, and S3 detected at the external pins T1, T2, and T3 are distinct from each other. The BBP 32 and the RF transceiver 38 of FIG. 5 operate similarly as in the four-pin embodiment to generate various permutations during a transmit operation. In the present implementation, the differential digital interface 40 includes three pins at each of the line drivers 46, 44 and the line receivers 42, 48. As a result, the RF transceiver 38 can generate 6 permutations (i.e., 6 predetermined values) of a set of voltage levels which equates to approximately 2.58 bits of data throughput. During a transmit operation, the RF transceiver 38 may decode adjacent symbols simultaneously, thereby effectively receiving approximately 5 bits of information.

The three-pin implementation of the differential digital interface 40 operates in similar fashion to the four-pin implementation of FIG. 3 as illustrated by FIGS. 6(a), 6(b), and 6(c). Both the three-pin and the four-pin implementation are compatible with conventional digital interfaces. In FIG. 6(a) includes a table 80 illustrating examples of absolute voltage levels associated with the six permutations of the three-pin permutation during a single symbol period. FIG. 6(b) includes a table 90 illustrating various examples of voltage differential levels corresponding to the 6 permutations of the three-pin implementation. FIG. 6(c) includes an exemplary table 100 illustrating binary values that respectively correspond to the voltage differential levels of FIG. 6(b). Like the four-pin implementation, the three-pin implementation includes a decoder that generates the binary values based on decoding the sign (i.e. positive or negative) of each respective voltage differential level of FIG. 6B. The table 100 further includes a set of predetermined values that each correspond to one of the 6 permutations.

Referring now to FIG. 7(a), a table 110 illustrating examples of various voltage differential levels corresponding to the 36 permutations of the three pin implementation that result when two adjacent symbols are decoded simultaneously is shown. The table 110 depicts voltage differential levels generated by utilizing an optimal decoder that includes an analog-to-digital converter. In other words, the optimal decoder processes the value of the differential voltage level as opposed to only the sign of the voltage differential level as the zero-crossing decoder.

As mentioned previously, the RF transceiver 38 can receive approximately 5 bits of information when adjacent symbols are decoded. By decoding adjacent symbols, 36 distinct permutations are capable of being generated using the three-pin implementation. For example, the RF transceiver 38 detects the existence of permutation 13 when the voltage differential levels between the external pins T1 and T2, T1 and T3, and T2 and T3 respectively equal −0.20V, 0.20V, and 0.40V during a first symbol period and respectively equal 0.40V, 0.20V, and −0.20V during a second symbol period as depicted in table 110. For each permutation generated based on symbol 1 and symbol 2, table 110 also includes a "distance" value based on the difference between corresponding voltage differential levels of each permutation and a reference permutation. In other words, a distance value is generated between each permutation and all other permutations where each permutation corresponds to a distinct constellation point discussed in detail below. In the present example, permutation 0 serves as the reference permutation although the present disclosure contemplates utilizing any of the permutations (e.g. 0-35) as the reference permutation.

For example, the difference values of the differential voltage levels between permutations 0 and 13 equal 0.40V, 0.20V, and −0.20V for T1-T2, T1-T3, and T2-T3, respectively, for symbol 1. In the present implementation, each difference value is raised to an exponential (e.g., $2^{nd}$) and then divided by a dividing factor (e.g., four) resulting in the values 0.04, 0.01, and 0.01 as depicted in the table entries corresponding to permutation 13 under symbol 1 in table 110. Though not shown in FIG. 7(a), these steps are iteratively repeated such that each of the permutations 0 through 35 serves as the reference permutation during an iteration. Referring to the present example, a sum value is generated based on the distance values for symbols 1 and 2 for each permutation. For example, the sum value corresponding to the distance values for permutation 13 equals 0.12 based the distance values 0.04, 0.01, and 0.01 for symbol 1 and 0.01, 0.01, and 0.04 for symbol 2. In the present example (i.e., the optimal decoder) the average distance between each of the 36 permutations approximately equals 0.246857 and the minimum distance among the 36 permutations (i.e., 36 distinct constellation points) equals 0.06.

FIG. 7(b) illustrates a table 120 of examples of various voltage differential levels corresponding to the 36 permutations of the three-pin implementation that result when two adjacent symbols are decoded simultaneously using a zero-crossing decoder. The table 120 is generated in similar fashion to the table 110 of FIG. 7(a). However, the zero-crossing decoder utilized to generate table 120 does not include analog-to-digital converters. Like the previous example, the average distance between each of the 36 permutations approximately equals 0.246857 for the zero-crossing decoder. However, the minimum distance among the 36 permutations equals 0.04 for the zero-crossing decoder as compared to 0.06 for the optimal decoder. In other words, the separation of constellation points corresponding to each permutation is greater (i.e., the constellation points are more readily distinguishable) when utilizing the optimal decoder thereby requiring less resolution to ensure proper operation. As such, the optimal decoder lessens the likelihood of error during transmission over the differential digital interface 40 of the present disclosure.

Figure 7C:
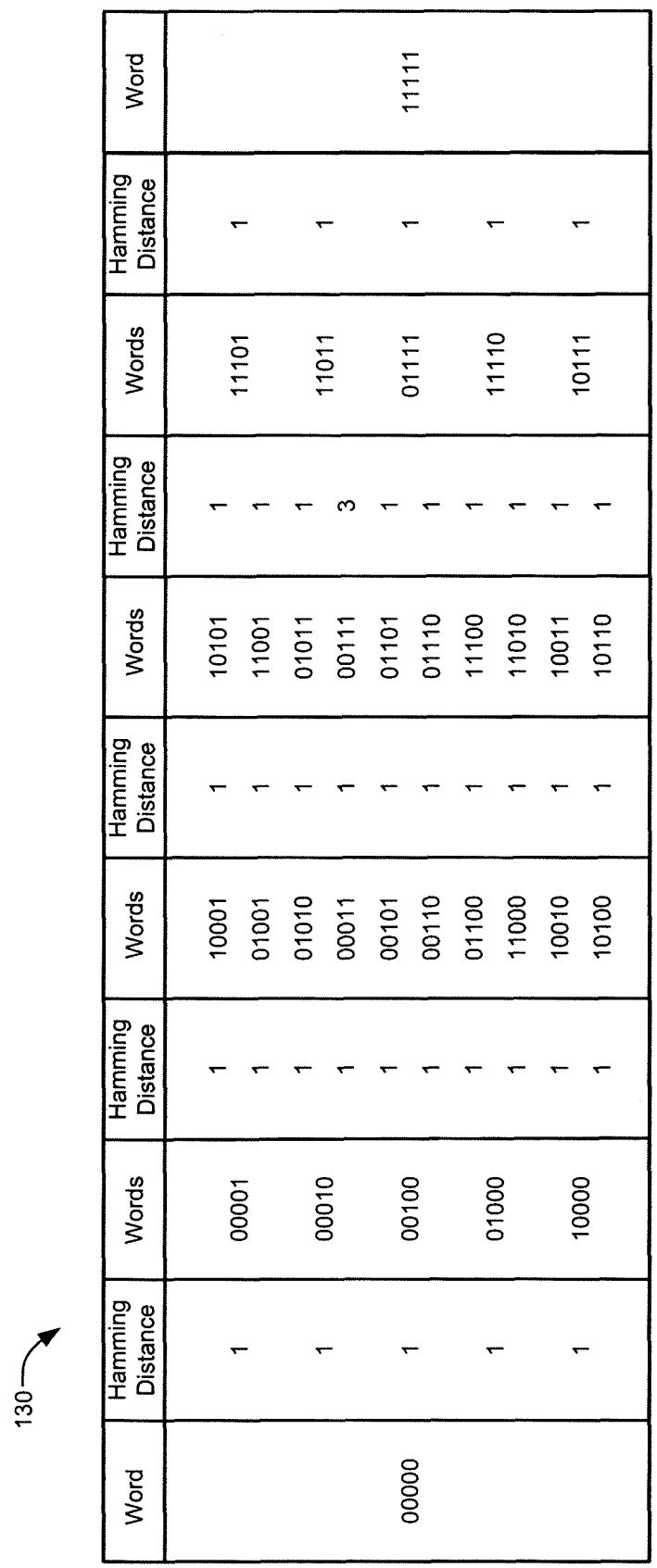
FIG. 7(c) is a table illustrating an example of a Hamming arrangement of the exemplary permutations when two symbols are decoded simultaneously according to the present disclosure.

Referring now to FIG. 7(c), a table 130 illustrating an example of a Hamming arrangement (i.e., a linear error-correcting arrangement) using 32 permutations (i.e., 5 bits of data) is shown. In various embodiments, the remaining 4 permutations (i.e., 0.16 bits of data) of the 36 permutations can be used for signaling purposes. In the present example, the 32 permutations are encoded such that their minimal Euclid distance will be mapped to the minimal Hamming distance in order to minimize the number of bits which could erroneously be received. The Hamming distance between two data words of equivalent resolution is determined based on the number of positions at which corresponding symbols of the two data words vary. In other words, the Hamming distance is indicative of the number of errors that must occur for one data word to be modified to create a second data word.

For example, the Hamming distance between a digital word of "00000" and each of the digital words "00001", "00010", "00100", "01000", and "10000" is equal to 1. Additionally, within each column of digital words depicted in FIG. 7(c), the Hamming distance equals 2 between adjacent digital words. The table 120 represents a heuristic arrangement. Those skilled in the art will appreciate that other Hamming arrangements of the 32 permutations are contemplated.

Referring to FIGS. 7(a) and 7(c), the 32 permutations decoded by optimal decoder are selectively assigned to the digital words of the Hamming arrangement in order to minimize potential errors in transmission of data. In other words, permutations are selectively assigned to the digital words based on their respective sum values. The probability of erroneously decoding a permutation having a minimal distance from another permutation (e.g., the distance from permutation 1 to permutation 0 equals 0.6) is greater than the probability of a permutation having a substantially greater distance from another permutation (e.g., the distance from permutation 1 to permutation 23 equals 0.42). Therefore, permutations having a minimal distance from each other are assigned to digital words such that the smallest Hamming distance (e.g., 1) exists between the digital words. In this manner, if an error does occur, the effect of the error will be minimized. For example, the optimal decoder may decode the voltage differential levels associated with permutation 0 to correspond to the digital word "00000". As mentioned above, the sum value of the distance between permutation 0 and permutation 1 equals the minimum distance of 0.6. Therefore, in the present example, the voltage differential levels associated with permutation 1 preferably would correspond to one of the digital words "00001", "00010", "00100", "01000", or "10000" such that if an error were to occur, the error would likely be manifested in a single bit of variance from the desired data word.

Figure 8:
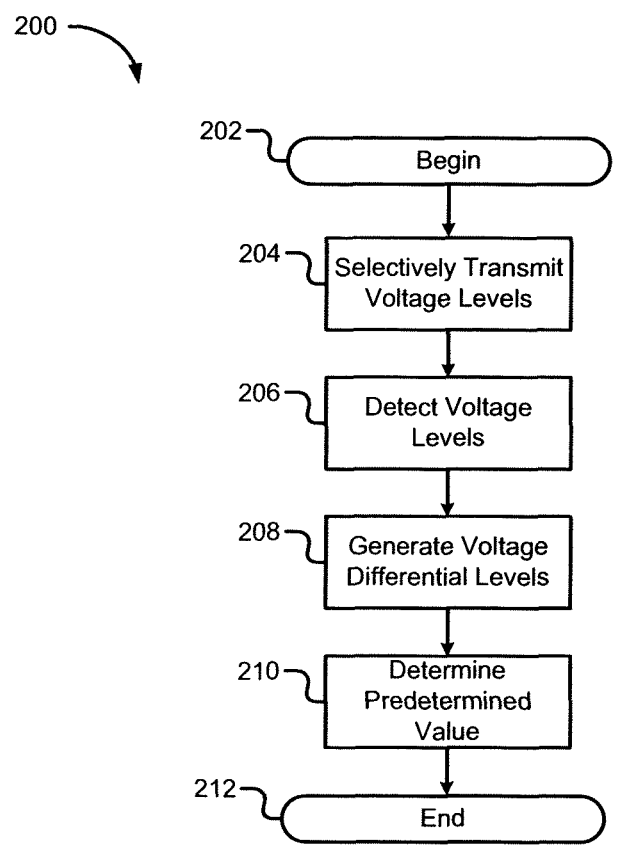
FIG. 8 is a flow diagram illustrating steps of transmitting data during a single symbol period of a transmit operation via the digital interface system according to the present disclosure.

Referring now to FIG. 8, a method 200 of transmitting data during a single symbol period of a transmit operation (i.e., data transmitted from a BBP to a RF transceiver) via the differential digital interface system is shown in more detail. As noted previously, the principles of the present disclosure are generally applicable to a plurality of devices that include serial digital interfaces.

The method 200 begins at step 202. In step 204, the BBP 32 selectively transmits a distinct voltage level of a set of voltage levels over each of the lines based on data to be communicated from the BBP 32 to the RF transceiver 38. In other words, each transmission line transmits a voltage level distinct from another voltage level transmitted on another transmission line. In step 206, the RF transceiver 38 detects the voltage levels at the external RF transceiver pins. In step 208, the RF transceiver 38 calculates a unique set of voltage differential levels based on the voltage levels received at each respective pin of the external RF transceiver pins. In step 210, the RF transceiver 38 determines a permutation associated with the particular set of voltage differential levels, thereby determining the predetermined value corresponding to the set of voltage differential levels. In step 212, the method 200 ends.

Figure 9B:
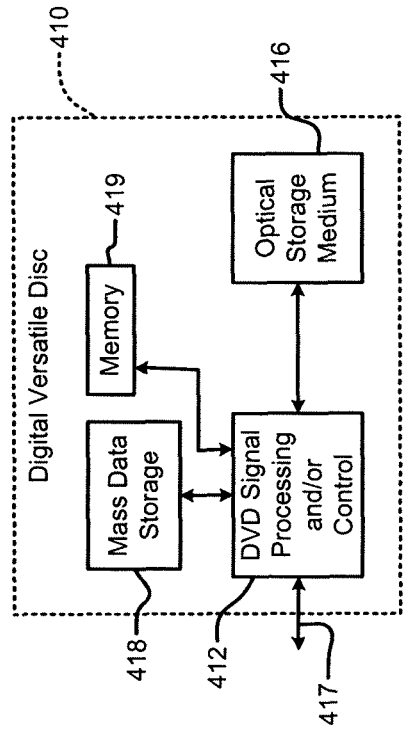
FIG. 9(b) is a functional block diagram of a digital versatile disk (DVD)
Figure 9A:
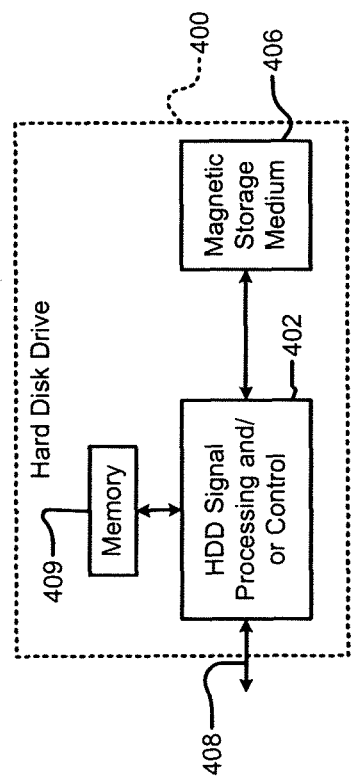
FIG. 9(a) is a functional block diagram of a hard disk drive.
Figure 9D:
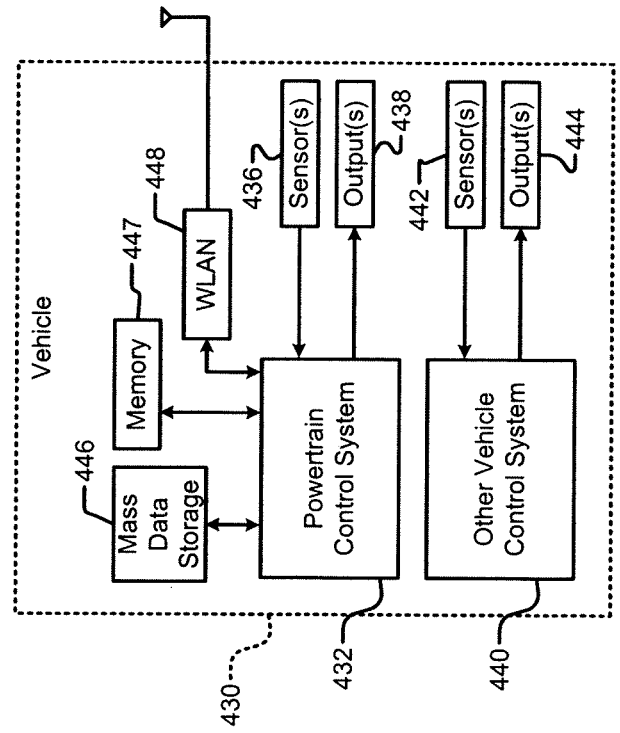
FIG. 9(d) is a functional block diagram of a vehicle control system.
Figure 9C:
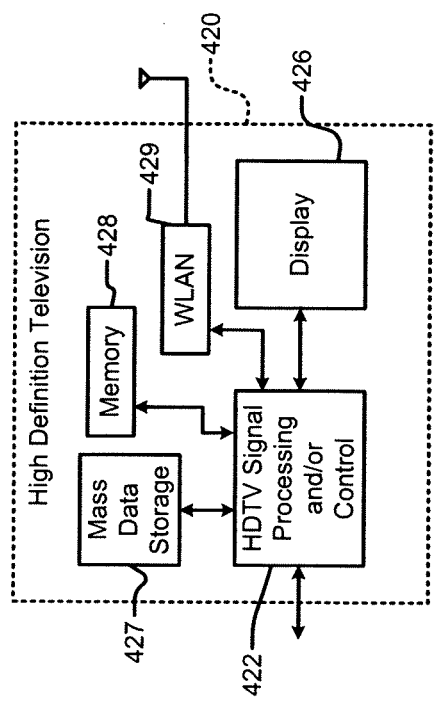
FIG. 9(c) is a functional block diagram of a high definition television.
Figure 9E:
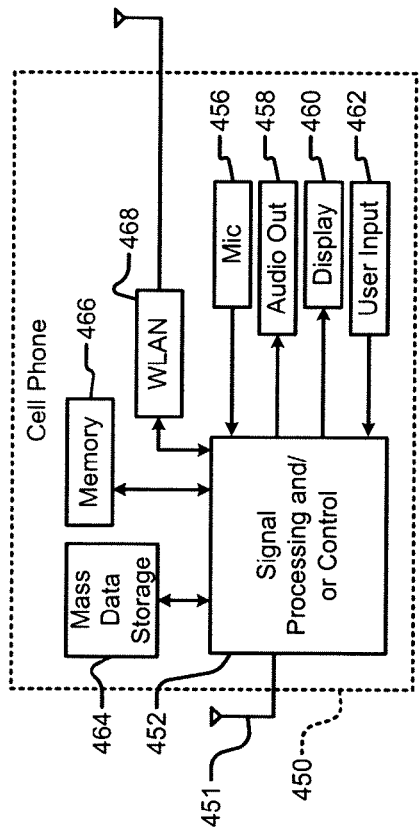
FIG. 9(e) is a functional block diagram of a cellular phone.

The differential digital interface system of present disclosure has been described above with reference to an interface between a BBP and a RF transceiver. FIGS. 9(a) to 9(h) depict other exemplary embodiments employing the differential digital interface system. Those skilled in the art will appreciate that various other embodiments of the differential digital interface system are anticipated. Referring to FIG. 9(a), the present disclosure may be embodied in a hard disk drive (HDD) 400. HDD 400 may communicate with a host device (not shown) such as a computer, mobile computing devices such as personal digital assistants, cellular phones, media or MP3 players and the like, and/or other devices via one or more wired or wireless communication links 408.

The present disclosure may be implemented with either or both signal processing and/or control circuits, which are generally identified in FIG. 9(*a*) at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406. HDD 400 may be connected to memory 409, such as random access memory (RAM), a low latency nonvolatile memory such as flash memory, read only memory (ROM) and/or other suitable electronic data storage.

Referring now to FIG. 9(*b*), the present disclosure may be implemented in a digital versatile disc (DVD) drive 410. The present disclosure may be implemented in either or both signal processing and/or control circuits, which are generally identified in FIG. 9(*b*) at 412, and/or mass data storage 418 of DVD drive 410. Signal processing and/or control circuit 412 and/or other circuits (not shown) in DVD drive 410 may process data, perform coding and/or encryption, perform calculations, and/or format data that is read from and/or data written to an optical storage medium 416. In some implementations, signal processing and/or control circuit 412 and/or other circuits (not shown) in DVD drive 410 can also perform other functions such as encoding and/or decoding and/or any other signal processing functions associated with a DVD drive.

DVD drive 410 may communicate with a device (not shown) such as a computer, television or other device via one or more wired or wireless communication links 417. DVD drive 410 may communicate with mass data storage 418 that stores data in a nonvolatile manner. Mass data storage 418 may include a HDD such as that shown in FIG. 9(*a*). The HDD may be a mini HDD that includes one or more platters having a diameter that is smaller than approximately 1.8". DVD drive 410 may be connected to memory 419, such as RAM, ROM, low latency nonvolatile memory such as flash memory, and/or other suitable electronic data storage.

Referring now to FIG. 9(*c*) the present disclosure may be embodied in a high definition television (HDTV) 420. The present disclosure may be implemented in either or both signal processing and/or control circuits, which are generally identified in FIG. 9(*c*) at 422, a WLAN interface 429 and/or mass data storage 427 of the HDTV 420. HDTV 420 may receive HDTV input signals in either a wired or wireless format via one or more wired or wireless communication links 424 and generate HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one HDD may have the configuration shown in either FIG. 9(*a*) and/or at least one DVD may have the configuration shown in FIG. 9(*b*). The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429.

Referring now to FIG. 9(*d*), the present disclosure may be implemented in a control system of a vehicle 430, a WLAN interface 448 and/or mass data storage 446 of the vehicle control system. In some implementations, the present disclosure is implemented in a power-train control system 432 that receives inputs from one or more sensors 436 such as temperature sensors, pressure sensors, rotational sensors, airflow sensors and/or any other suitable sensors and/or that generates one or more output control signals such as engine operating parameters, transmission operating parameters, and/or other control signals at one or more output(s) 438.

The present disclosure may also be embodied in other control systems 440 of vehicle 430. Control system 440 may likewise receive signals from input sensors 442 and/or output control signals to one or more output(s) 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices, for example HDDs and/or DVDs. At least one HDD may have the configuration shown in FIG. 9(*a*) and/or at least one DVD may have the configuration shown in FIG. 9(*b*). The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448. The control system 440 may also include mass data storage, memory and/or a WLAN interface (all not shown).

Referring now to FIG. 9(*e*), the present disclosure may be embodied in a cellular phone 450 that may include a cellular antenna 451. The present disclosure may be implemented in either or both signal processing and/or control circuits, which are generally identified in FIG. 9(*e*) at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices, for example HDDs and/or DVDs. At least one HDD may have a configuration shown in FIG. 9(*a*) and/or at least one DVD may have the configuration shown in FIG. 9(*b*). The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 9F:
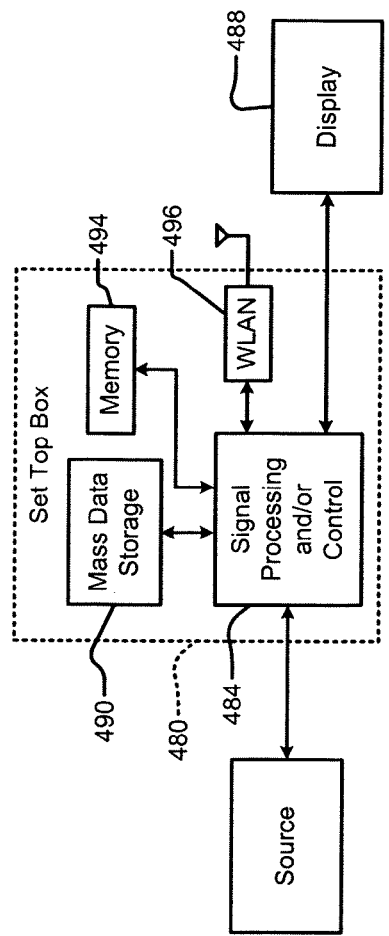
FIG. 9(f) is a functional block diagram of a set top box.

Referring now to FIG. 9(f), the present disclosure may be embodied in a set top box 480. The present disclosure may be implemented in either or both signal processing and/or control circuits, which are generally identified in FIG. 9(f) at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices, for example HDDs and/or DVDs. At least one HDD may have a configuration shown in FIG. 9(a) and/or at least one DVD may have the configuration shown in FIG. 9(b). The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496.

Figure 9G:
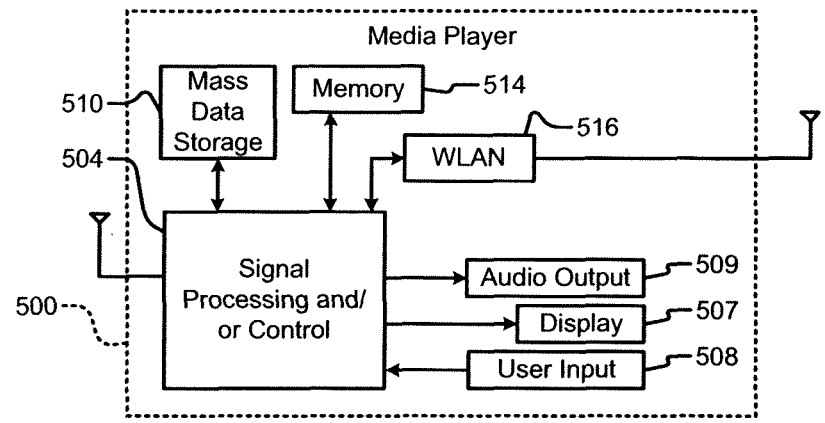
FIG. 9(g) is a functional block diagram of a media player.

Referring now to FIG. 9(g), the present disclosure may be embodied in a media player 500. The present disclosure may be implemented in either or both signal processing and/or control circuits, which are generally identified in FIG. 9(g) at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage 510 may include optical and/or magnetic storage devices, for example HDDs and/or DVDs. At least one HDD may have a configuration shown in FIG. 9(a) and/or at least one DVD may have the configuration shown in FIG. 9(b). The HDD may be a mini HDD that includes one or more platters having a diameter that is smaller than approximately 1.8".

Media player 500 may be connected to memory 514 such as RAM, ROM, low latency nonvolatile memory such as flash memory and/or other suitable electronic data storage. Media player 500 also may support connections with a WLAN via a WLAN network interface 516. Still other implementations in addition to those described above are contemplated.

Figure 9H:
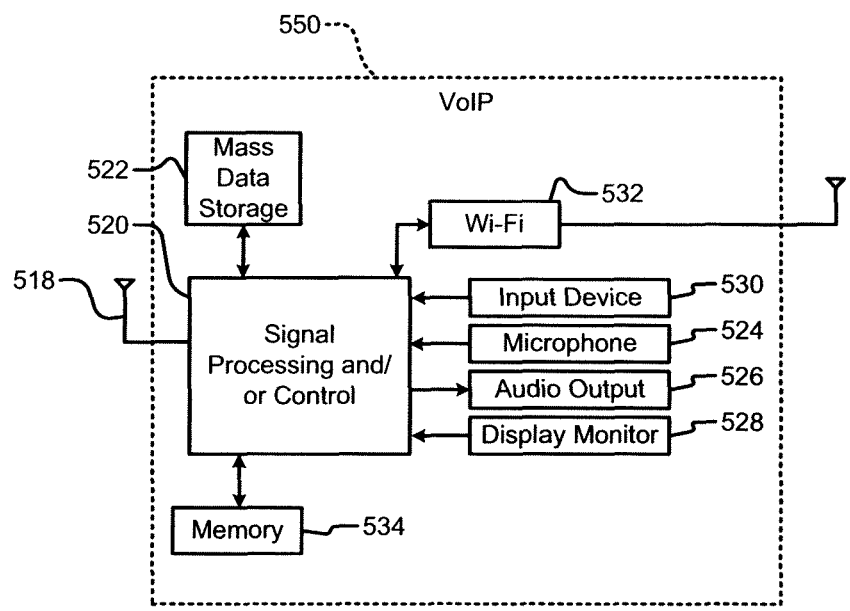
FIG. 9(h) is a functional block diagram of a VoIP phone.

Referring to FIG. 9(h), the present disclosure may be embodied in a Voice over Internet Protocol (VoIP) phone 550 that may include an antenna 518. The present disclosure may be implemented in either or both signal processing and/or control circuits, which are generally identified in FIG. 9(h) at 520, a wireless interface and/or mass data storage of the VoIP phone 550. In some implementations, VoIP phone 550 includes, in part, a microphone 524, an audio output 526 such as a speaker and/or audio output jack, a display monitor 528, an input device 530 such as a keypad, pointing device, voice actuation and/or other input devices, and a Wi-Fi communication module 532. Signal processing and/or control circuits 520 and/or other circuits (not shown) in VoIP phone 550 may process data, perform coding and/or encryption, perform calculations, format data and/or perform other VoIP phone functions.

VoIP phone 550 may communicate with mass data storage 522 that stores data in a nonvolatile manner such as optical and/or magnetic storage devices, for example HDDs and/or DVDs. At least one HDD may have a configuration shown in FIG. 9(a) and/or at least one DVD may have the configuration shown in FIG. 9(b). The HDD may be a mini HDD that includes one or more platters having a diameter that is smaller than approximately 1.8". VoIP phone 550 may be connected to memory 534, which may be a RAM, ROM, low latency nonvolatile memory such as flash memory and/or other suitable electronic data storage. VoIP phone 550 is configured to establish communications link with a VoIP network (not shown) via Wi-Fi communication module 532.

All of the discussion above, regardless of the particular implementation being described, is provided as an example and is not intended to be limiting. Although specific components of the differential digital interface system are described, methods, systems, and articles of manufacture consistent with the differential digital interface system may include additional or different components. For example, components of the differential digital interface system may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the differential digital interface system may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the disclosure can take and not as a definition of the disclosure. It is only the following claims, including all equivalents, that are intended to define the scope of this disclosure.

What is claimed is:

1. A digital interface system comprising:
   a first circuit configured to transmit a set of three or more voltage levels, wherein respective ones of the three or more voltage levels are different from another of the three or more voltage levels; and
   a second circuit configured to:
   receive the set of three or more voltage levels from the first circuit;
   detect a set of three or more voltage differentials corresponding to the received set of three or more voltage levels, wherein a respective voltage differential in the set of three or more voltage differentials represents a difference between two voltage levels among the received set of three or more voltage levels; and
   decode the set of three or more voltage differentials to determine a coded value among a plurality of predetermined coded values.

2. The system of claim 1 wherein the first circuit is configured to electrically communicate with the second circuit via a first plurality of pins of the first circuit and a second plurality of pins of the second circuit.

3. The system of claim 1, wherein the second circuit is configured to generate the set of three or more voltage differentials during a symbol period of operation of the digital interface system.

4. The system of claim 2 wherein each of the first plurality of pins and the second plurality of pins includes at least three pins.

5. The system of claim 4 wherein the first circuit is configured to respectively transmit a first voltage level, a second voltage level, and a third voltage level at a first pin, a second pin, and a third pin of the first plurality of pins and the second circuit is configured to respectively receive the first voltage level, the second voltage level, and the third voltage level at a first pin, a second pin, and a third pin of the second plurality of pins.

6. The system of claim 5 wherein the second circuit is configured to selectively generate the set of three or more voltage differentials based on differences among the first voltage level, the second voltage level, and the third voltage level with each other.

7. The system of claim 6 wherein the second circuit is configured to generate a plurality of sets of voltage differentials when the first circuit switches the transmission of two of the first voltage level, the second voltage level, and the third voltage level at the first plurality of pins, wherein each of the plurality of sets of voltage differentials corresponds to one of a plurality of predetermined values.

8. The system of claim of claim 1 wherein the second circuit is configured to generate the set of three or more voltage differentials during adjacent symbol periods of operation of the digital interface system.

9. The system of claim 1 wherein the digital interface system is included within user equipment for use on a cellular network.

10. The system of claim 9 wherein the user equipment includes at least one of a desktop computer, a personal digital assistant, a mobile phone, a laptop, a personal computer, a printer, a digital camera and an internet protocol phone.

11. A digital interface method, comprising:
    transmitting, with a first circuit, a set of three or more voltage levels, wherein respective ones of the three or more voltage levels are different from another of the three or more voltage levels; and
    receiving, with a second circuit, the set of three or more voltage levels from the first circuit;
    detecting, with the second circuit, a set of three or more voltage differentials corresponding to the received set of three or more voltage levels, wherein a respective voltage differential in the set of three or more voltage differentials represents a difference between two voltage levels among the received set of three or more voltage levels; and
    decoding, with the second circuit, the set of three or more voltage differentials to determine a coded value among a plurality of coded values.

12. The method of claim 11 further comprising providing communication between a first circuit and a second circuit via a first plurality of pins of the first circuit and a second plurality of pins of the second circuit.

13. The method of claim 11 further comprising generating the plurality of three or more voltage differentials during a symbol period of operation of the digital interface system.

14. The method of claim 12 wherein each of the first plurality of pins and the second plurality of pins includes at least three pins.

15. The method of claim 14 further comprising respectively transmitting a first voltage level, a second voltage level, and a third voltage level at a first pin, a second pin, and a third pin of the first plurality of pins and respectively receiving the first voltage level, the second voltage level, and the third voltage level at a first pin, a second pin, and a third pin of the second plurality of pins.

16. The method of claim 15 further comprising selectively generating the set of three or more voltage differentials based on differences among the first voltage level, the second voltage level, and the third voltage level with each other.

17. The method of claim 16 further comprising generating a plurality of sets of voltage differentials when the first circuit switches the transmission of two of the first voltage level, the second voltage level, and the third voltage level at the first plurality of pins, wherein each of the plurality of sets of voltage differentials corresponds to one of a plurality of predetermined values.

18. The method of claim of claim 11 further comprising generating the set of three or more voltage differentials during adjacent symbol periods of operation of the digital interface system.

19. The method of claim 11 wherein the digital interface method is implemented within user equipment for use on a cellular network.

20. The method of claim 19 wherein the user equipment includes at least one of a desktop computer, a personal digital assistant, a mobile phone, a laptop, a personal computer, a printer, a digital camera and an internet protocol phone.

21. The digital interface system of claim 1, wherein the set of three or more voltage differentials comprises all possible differences between two voltage levels among the received set of three or more voltage levels.

22. The digital interface system of claim 1, wherein the three or more voltage levels comprises three or more absolute voltage levels.

23. The method of claim 11, wherein the set of three or more voltage differentials comprises all possible differences between two voltage levels among the received set of three or more voltage levels.

24. The method of claim 11, wherein the three or more voltage levels comprises three or more absolute voltage levels.

* * * * *